United States Patent
Milvaney et al.

(10) Patent No.: US 11,244,100 B2
(45) Date of Patent: Feb. 8, 2022

(54) VISUALIZING CHANGES BASED ON DOCUMENT SCOPE

(71) Applicant: Microsoft Technology Licensing, LLC, Redmond, WA (US)

(72) Inventors: Douglas Lane Milvaney, Somerville, MA (US); Benjamin Gustav Wilde, Quincy, MA (US); Arthur David Berman, Waltham, MA (US); Christopher Ryan Botaish, Reading, MA (US); Joan Catharine Weaver, Somerville, MA (US); Lyndsy Marie Stopa, Lancaster, NY (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 75 days.

(21) Appl. No.: 16/406,854

(22) Filed: May 8, 2019

(65) Prior Publication Data

US 2020/0356623 A1    Nov. 12, 2020

(51) Int. Cl.
*G06F 16/176* (2019.01)
*G06F 40/106* (2020.01)
(Continued)

(52) U.S. Cl.
CPC .......... *G06F 40/106* (2020.01); *G06F 16/14* (2019.01); *G06F 16/168* (2019.01); *G06F 16/176* (2019.01); *G06F 40/166* (2020.01); *G06F 40/197* (2020.01); *G06Q 10/101* (2013.01); *H04L 12/1831* (2013.01)

(58) Field of Classification Search
CPC ...... G06F 16/93; G06F 16/219; G06F 16/907; G06F 16/1873; G06F 16/2358; G06F 40/106; G06F 40/197; G06F 40/166; G06F 40/169; G06F 2201/86; G06F 2201/835; G06F 2221/2151; G06F 3/04842;
(Continued)

(56) References Cited

U.S. PATENT DOCUMENTS 8,122,364 B2 * 2/2012 Yozell-Epstein .... G06Q 10/107
715/752
8,566,301 B2 10/2013 Rueben et al.
(Continued)

OTHER PUBLICATIONS

Vidur Apparao and Peter Sharpe, "Document Object Model Range," copyright 2000, published by w3.org, https://web.archive.org/web/20000815095143/http://www.w3.org/TR/DOM-Level-2/range.html, pp. 1-21 (Year: 2000).*

(Continued)

*Primary Examiner* — Maikhanh Nguyen

(57) ABSTRACT

Technology is disclosed herein for visualizing changes in documents. In an implementation, one or more computers, employing a change visualization process, maintain a record of changes made to a document over a period of time. The one or more computers identify a document scope within which to focus a visualization of one or more changes made to the document, wherein the document scope comprises a timeframe of interest. The one or more computers also identify, from the record of the changes, one or more changes made to the document within the document scope and surface a visualization of the one or more changes.

20 Claims, 9 Drawing Sheets

(51) Int. Cl.
  *G06F 40/166* (2020.01)
  *G06F 40/197* (2020.01)
  *G06F 16/14* (2019.01)
  *G06F 16/16* (2019.01)
  *G06Q 10/10* (2012.01)
  *H04L 12/18* (2006.01)

(58) Field of Classification Search
  CPC ..... G06T 11/206; G06T 7/0016; H04L 67/22; H04L 12/1831; H04L 43/04
  See application file for complete search history.

(56) References Cited

U.S. PATENT DOCUMENTS

| | | | |
|---|---|---|---|
| 8,738,706 | B1 | 5/2014 | Grieve et al. |
| 8,739,021 | B2 | 5/2014 | Yuniardi |
| 8,965,983 | B2* | 2/2015 | Costenaro .............. G06Q 10/10 709/206 |
| 9,053,079 | B2 | 6/2015 | Bailor et al. |
| 9,135,312 | B2 | 9/2015 | Greenspan et al. |
| 10,082,927 | B2* | 9/2018 | Lemonik .............. G06F 40/166 |
| 2007/0060205 | A1 | 3/2007 | Kim |
| 2008/0177782 | A1* | 7/2008 | Poston ................. G06F 40/197 |
| 2010/0023851 | A1 | 1/2010 | Schormann |
| 2010/0095224 | A1* | 4/2010 | Yozell-Epstein .... G06Q 10/107 715/752 |
| 2012/0185762 | A1 | 7/2012 | Ozer et al. |
| 2012/0271867 | A1 | 10/2012 | Grossman et al. |
| 2012/0272151 | A1 | 10/2012 | Grossman et al. |
| 2012/0284344 | A1* | 11/2012 | Costenaro ............. G06F 40/197 709/206 |
| 2013/0262420 | A1 | 10/2013 | Edelstein et al. |
| 2014/0033068 | A1 | 1/2014 | Gupta et al. |
| 2014/0195899 | A1 | 7/2014 | Bastide et al. |
| 2014/0279843 | A1 | 9/2014 | Von Weihe |
| 2014/0281872 | A1 | 9/2014 | Glover |
| 2014/0289645 | A1 | 9/2014 | Megiddo et al. |
| 2014/0298198 | A1 | 10/2014 | Kuchibhotla et al. |
| 2015/0100580 | A1 | 4/2015 | Mathur et al. |
| 2015/0134600 | A1 | 5/2015 | Eisner et al. |
| 2015/0269146 | A1* | 9/2015 | Ayyar .................. G06Q 10/101 707/608 |
| 2015/0339282 | A1 | 11/2015 | Goyal |
| 2016/0139768 | A1* | 5/2016 | Lemonik .............. G06F 40/169 715/753 |
| 2016/0378734 | A1* | 12/2016 | Mullins ................. G06F 40/131 715/229 |
| 2017/0185574 | A1 | 6/2017 | Fern et al. |
| 2017/0337194 | A1* | 11/2017 | Gilchrist .............. G06F 40/166 |
| 2018/0276004 | A1* | 9/2018 | Bache ...................... G06F 8/38 |

OTHER PUBLICATIONS

Oracle, "About Time Frames," copyright 2002, published by Oracle, https://docs.oracle.com/health-sciences/empirica-study-80/WEWUG/About_Time_Frames.htm, pp. 1-2. (Year: 2002).*
Solomon Poretsky, "List of Commonly Used Business Software," copyright 2013, published by smallbusiness.chron.com, https://web.archive.org/web/20130425083814/https://smallbusiness.chron.com/list-commonly-used-business-software-59849.html, pp. 1-3. (Year: 2013).*
"Final Office Action Issued in U.S. Appl. No. 14/982,832", dated Oct. 30, 2019, 19 Pages.
"Quip changes the way teams work together", Retrieved From: https://quip.com/about/tour, Retrieved Date: Oct. 9, 2015, 5 Pages.
"Revision control—Wikipedia the free encyclopedia", Retrieved From: http://en.wikipedia.org/w/index.php?title=Revision_control&oldid=589765566, Jan. 8, 2014, 10 Pages.
"Team Up to Build Powerful Documents", Retrieved From: https://www.zoho.com/writer/, Retrieved Date: Oct. 9, 2015, 7 Pages.
"Final Office Action Issued in U.S. Appl. No. 14/982,832", dated Dec. 21, 2017, 17 Pages.
"Final Office Action Issued in U.S. Appl. No. 14/982,832", dated Nov. 9, 2018, 19 Pages.
"Non Final Office Action Issued in U.S. Appl. No. 14/982,832", dated May 9, 2018, 18 Pages.
"Non Final Office Action Issued in U.S. Appl. No. 14/982,832", dated Jul. 21, 2017, 17 Pages.
"Non Final Office Action Issued in U.S. Appl. No. 14/982,832", dated May 24, 2019, 20 Pages.
Bendix, et al., "VTML for Fine-Grained Change Tracking in Editing Structured Documents", In Proceedings of the 9th International Symposium on System Configuration Management, Sep. 5, 1999, 18 Pages.
"International Search Report and Written Opinion Issued in PCT Application No. PCT/US2016/066743", dated Apr. 6, 2017, 18 Pages.
Somers, James, "How I Reverse Engineered Google Docs", Retrieved From: http://features.jsomers.net/how-i-reverse-engineered-google-docs/, Nov. 5, 2014, 11 Pages.
"International Search Report and Written Opinion Issued in PCT Application No. PCT/US20/026951", dated Jun. 24, 2020, 12 Pages.

* cited by examiner

VISUALIZING CHANGES BASED ON DOCUMENT SCOPE

TECHNICAL FIELD

Aspects of the disclosure are related to the field of software applications, and in particular, to technology for visualizing changes in electronic documents.

TECHNICAL BACKGROUND

Track changes is a familiar feature in many word processing applications that allow for changes made to a document to be recorded and visualized. Such a feature allows users to easily review the changes that they or others in a collaborative environment made to a document. A user may accept or reject changes on an individual or batch basis and can control how the changes are viewed.

Most such features work by keeping records on all of the insertions, deletions, movements, and formatting in a document. The changes are visualized by striking through deleted text and underlying new text. Some applications track changes on a per-user basis, which is especially useful in the context of collaborative documents.

A shortcoming of the change tracking feature is the inability to see the progression of changes in a document. That is, the track changes feature displays all of the changes that have been made to a document to bring it to its current state. Some implementations of track changes allow the user to toggle back and forth between the original state of a document and its current state with the changes reflected. Filtering the changes on a per-user basis is also possible. Even so, the user must ascertain for herself how the changes progressed in the document.

Related to change tracking, version histories allow users to go back to a point in time to see a previous version or versions of a document. Past versions may thus be compared to the current version of the document or to each other to see the differences between them. This approach to visualizing changes has the drawback of requiring that separate versions of the document be produced and maintained. In addition, the user must still know a priori which versions to compare in order to find the changes that he or she is most interested in, all of which is cumbersome, time-consuming, and error prone, especially with respect to collaborative scenarios.

OVERVIEW

Technology is disclosed herein that enhances how changes made to electronic documents may be visualized. In an implementation, one or more computers, employing a change visualization process, maintain a record of changes made to a document over a period of time. The one or more computers identify a document scope within which to focus a visualization of one or more changes made to the document, wherein the document scope comprises a timeframe of interest. The one or more computers also identify, from the record of the changes, one or more changes made to the document within the document scope and surface a visualization of the one or more changes.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, like reference numerals in the drawings designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Technology disclosed herein enhances the ability of users to view changes made to electronic documents related to a desired document scope, such as a timeframe of interest, a section of interest, or both. A user may thus be given quick access to the changes that are relevant to the user, rather than having to piece together or otherwise intuit how a document came to be in its present state.

In various implementations, a record of changes made to a document is maintained, from which the relevant changes are identified. The changes are identified based on the desired document scope and may be visualized in a user interface. In one example, a user may specify a timeframe within the life of a document. The changes that occurred between the start and the end of the timeframe are identified and may be surfaced in a variety of ways.

For example, the state of the document or document section at the start of the timeframe may be displayed, followed by (or at the same time as) the state of the document or document section at the end of the timeframe. In other examples, a marked-up version of the document or document section may be created from the relative state of the document or document section at either end of the timeframe. Such a user experience may benefit user groups working in a collaborative environment on a shared document since one user will be able to quickly see the changes made by other users with respect to a particular document scope. However, individual users may also benefit from the user experience in that a user may wish to refresh his or her memory of how the changes to a document progressed.

The enhanced change visualization disclosed herein may be implemented in the context of an online service or application, locally in the context of an application running on an end-user device, distributed between local and cloud environments, or the like. In an example, the record of changes made to a document may be maintained in the cloud, locally, or in both environments. In another example, the changes relevant to a document scope may be identified in the cloud, locally, or in both environments. In yet another example, the visualizations of the changes may be generated in the cloud, locally, or in both environments.

Figure 1:
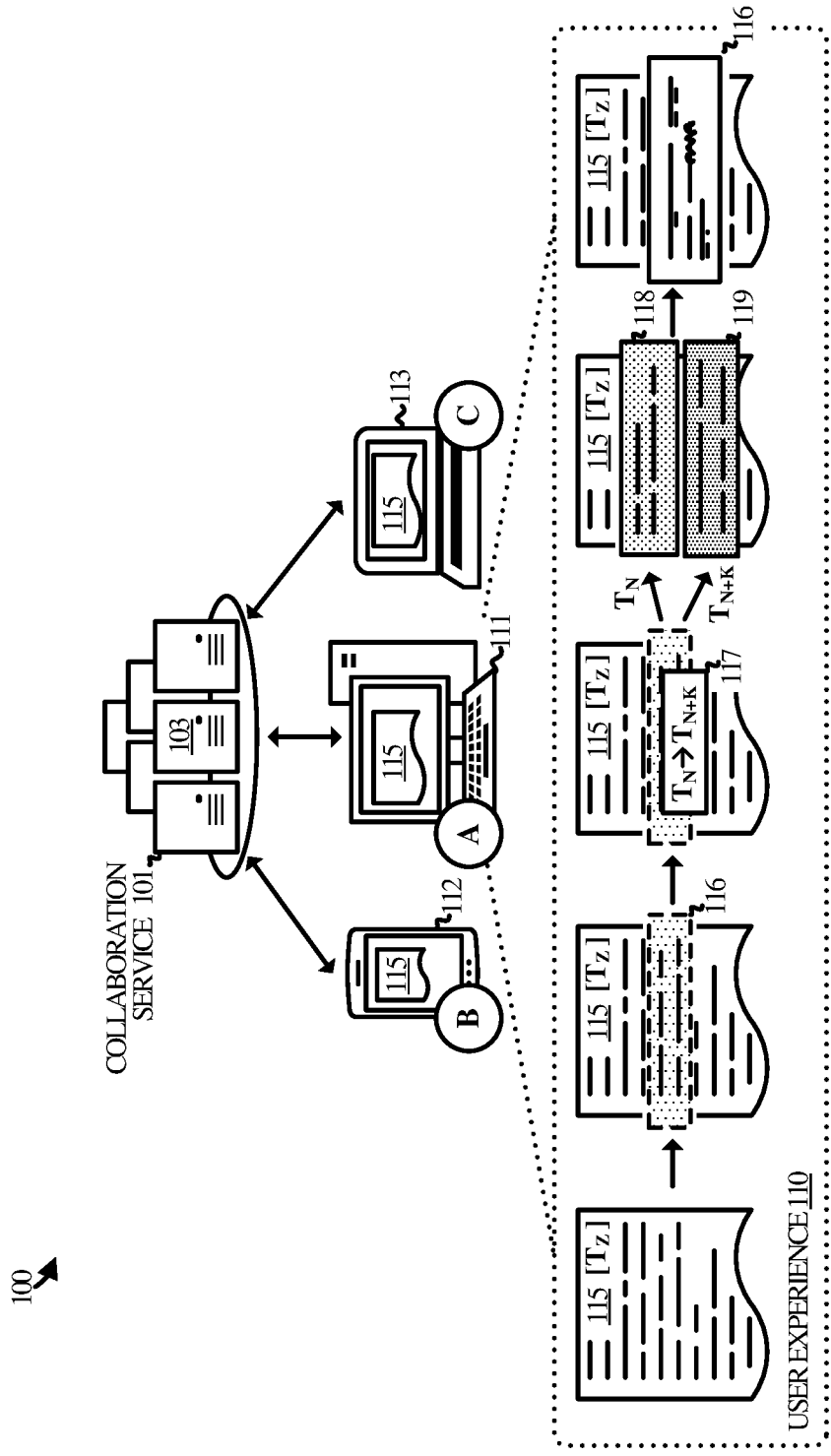
FIG. 1 illustrates an operational environment in an implementation.

Referring now to the drawings, FIG. 1 illustrates an operational environment 100 in an implementation of enhanced change visualization. Operational environment 100 includes a collaboration service 101, which provides support to end-points with respect to document collaboration. Computing device 111, computing device 112, and computing device 113 are representative of such end-points. Collaboration service 101 may be implemented on one or more computing devices 103 having an architecture as illustrated with respect to computing device 901 in FIG. 9. In addition, collaboration service 101 may be implemented as a stand-alone service or in the context of one or more other services. Collaboration service 101 communicates with computing devices 111, 112, and 113 over one or more communication networks.

Computing devices 111, 112, and 113 each include one or more applications capable of communicating and interfacing with collaboration service 101 to facilitate collaboration on documents amongst the members of a group. The applications may also be capable of allowing a user to view, edit, and review changes to an electronic document. Examples of such applications include, but are not limited to, word processing applications, spreadsheet applications, and slide presentation applications. The applications may be natively installed and executed applications, browser-based applications, mobile applications (or "apps"), streamed or streaming applications, or any combination or variation thereof.

Figure 9:
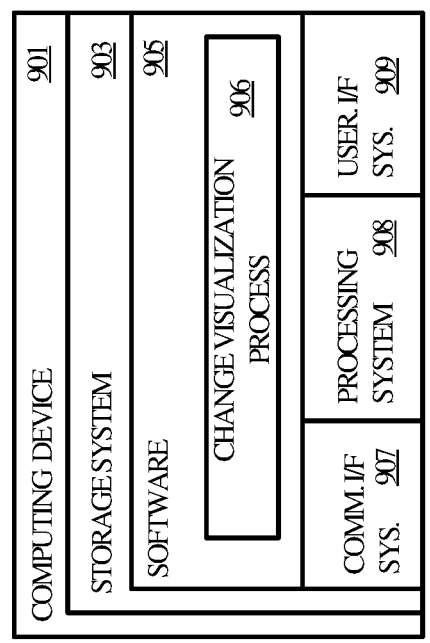
FIG. 9 illustrates a computing device suitable for implementing the various operational environments, architectures, processes, scenarios, and sequences discussed below with respect to the Figures.

Each of computing devices 111, 112, and 113 may also have a computing architecture as illustrated with respect to computing device 901 in FIG. 9. Examples of computing devices 111, 112, and 113 include, but are not limited to, personal computers (e.g. laptops and desktops), tablet computers, mobile phones, computing appliances, wearable computing devices, gaming devices, and the like.

In operation, end-users engage with the application(s) on computing devices 111, 112, and 113 via user interfaces when viewing and editing documents. The applications communicate via computing devices 111, 112, and 113 with collaboration service to send and receive data related to the collaboration, such as edits, updates, and the like.

Figure 2:
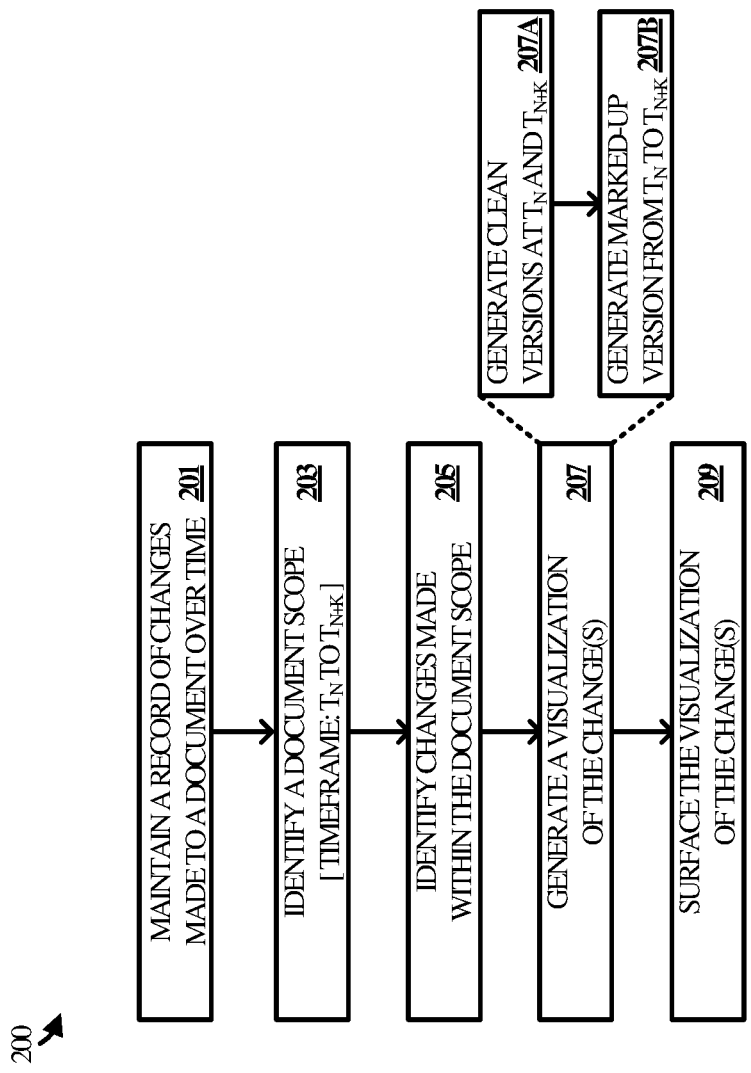
FIG. 2 illustrates a change visualization process in an implementation.

FIG. 2 illustrates a change visualization process 200 that may be implemented by an application running on any one or more of computing devices 111, 112, and 113, by collaboration service 101, or distributed between the application and the collaboration service 101. The application and/or service employ change visualization process 200 to enhance the user experience when interacting with electronic documents in collaboration contexts. Change visualization process 200 may be implemented in program instructions in the context of any of the modules, components, or other such programming elements of the application and/or service. The program instructions direct the underlying computing system(s) to operate as described for change visualization process 200, referring parenthetically to the steps in FIG. 2.

To begin, the program instructions direct the computing system(s) to maintain a record of changes made to a document over a period of time (step 201). The record of changes may be maintained locally with respect to an end-user (on his or her computing device), remotely (e.g. in the service), or distributed across both a local environment and the service. The record of changes identifies all of the edits made to the document over its lifespan, including additions and deletions of content (e.g. text) to and from the document. The record not only identifies the edits, but also includes a timestamp for each entry in the record that identifies the date and time of a given addition or deletion of content.

In some implementations, the record also identifies a section of a document to which an edit pertained. The section may be identified by a paragraph number, a page, or a line in the document, for example, or any combination of the three. In other examples, the record may identify objects, slides, images, cells, and/or cell ranges that were edited. In order to track sections as content is added to or removed from the document, blocks of content may be given section identifiers (IDs) that remain the same even as their position in the document changes. For example, a paragraph of text may be identified by a unique section ID and also a paragraph number. The unique section ID would remain the same over time, while the paragraph number may be incremented or decremented as content is added to or removed from the document.

As mentioned, sections in the document may correspond to one or more lines of text, distinct paragraphs, an entire page, or a group of pages. However, sections may also be defined in terms of the content of the document. As an example, the content of the document may be partitioned by chapters, headings, sub-headings, and the like, all of which may form the basis of a division of the document into sections that can be tracked as edits are made.

With the record of changes in-place, the program instructions direct the computing system(s) to identify a scope within which to focus a visualization of one or more changes made to the document (step 203). The scope may be identified by a timeframe of interest having a start time and an end time, for example. The program instructions then direct the computing system(s) to identify, from the record of the changes, one or more changes made to the document within the document scope (step 205). This may be accomplished by searching the record of changes for those having a timestamp that falls within the timeframe.

The program instructions next direct the computing system(s) to generate a visualization of the changes that were identified as within the document scope (step 207). This step may include sub-steps 207A and/or 207B in some implementations.

With respect to step 207A, the computing system(s) may, for instance, be directed to generate clean versions of the section of the document at both the start time and the end time of the timeframe. With respect to step 207B, the computing system(s) may, for instance, be directed to generate a marked-up version of the section that represents the changes that occurred to the section during the timeframe.

Finally, the program instructions direct the computing system(s) to surface the visualization of the changes in a user interface on a display (step 209). Surfacing the visualization of changes means causing the visualization to be displayed in the foreground of the user interface. In some implementations, causing the visualization to be displayed may include rendering the visualization. In other implementations, causing the visualization to be displayed may include requesting an operating system component(s) or some other element(s) to render the visualization. Displaying the visualization may include displaying both clean versions of the changes simultaneously, synchronously, or asynchronously in the user interface for the user to consider. In addition, the marked-up version may be displayed simultaneously, synchronously, or asynchronously with respect to the clean versions of the section. In some cases, the clean versions of the section are not displayed at all. Rather the marked-up version may be all that is displayed for the user to consider. In other cases, the marked-up version may not be displayed at all. Rather, the clean versions may be all that are displayed for the user to consider.

Referring back to FIG. 1, user experience 110 briefly illustrates an example use case of change visualization process 200. In operation, user A engages with document 115 on computing device 111. Document 115 is a collaborative document that user B and user C may also work on via computing device 112 and computing device 113 respectively. User experience 110 illustrates the user experience from the point of view of user A on computing device 111, although the same or a similar experience may be had by user B and user C.

User experience 110 begins with document 115 in a current state at time "z" represented by $T_Z$. Document 115 includes text or other such content on a document canvas. The content may have been supplied by one or more of user A, user B, and user C over a period of time during which the changes made to the document were recorded by collaboration service 101 and/or the applications on computing devices 111, 112, and 113.

It is assumed for exemplary purposes that user A wishes to see the progression of changes made to the document during a period of time and with respect to a particular section. Accordingly, user A supplies user input comprises a selection 116 of a section of the document. The user input may be supplied via a mouse action, a touch gesture, a voice command, or any other type of user input. Several lines of text are selected in this example, although one or more paragraphs, pages, or other such sections could be selected. In addition, the entire document could be selected for analysis and visualization and could be the default selection in the absence of a more granular selection.

Having made the selection 116 of a section of document 115, user A proceeds to provide user input 117 indicative of a timeframe of interest. User input 117 could be provided by mouse, touch gesture, voice command, keyboard input, or any other type of user input. For example, user input 117 could comprise a selection of dates from a menu to define a date range. In another example, user input 117 could be a selection of a date range from a set of possible date ranges. In this example, the timeframe supplied via user input 117 is represented in terms of a start time ($T_N$) and an end time ($T_{N+K}$). In some implementations, the timeframe falls within the time period for which changes have been recorded. That is, the start time falls after the beginning of the time period and the end time falls prior to the end of the time period.

Next, the changes related to the timeframe and section defined by the document scope are identified and surfaced in the user interface. In this example, two versions of the identified section are surfaced that correspond to the start and end times of the timeframe. Version 118 represents the state of the selected section at $T_N$, while version 119 represents the state of the section at $T_{N+K}$. In addition to (or instead of) versions 118 and 119, a marked-up version 116 of the section is surfaced. The marked-up version 116 identifies the progression of changes from version 118 relative to version 119. User A may thus consider one or both of the clean versions of the section, at either end of the timeframe, and the marked-up version of the section showing how the section changed from the beginning to the end of the timeframe.

Figure 3:
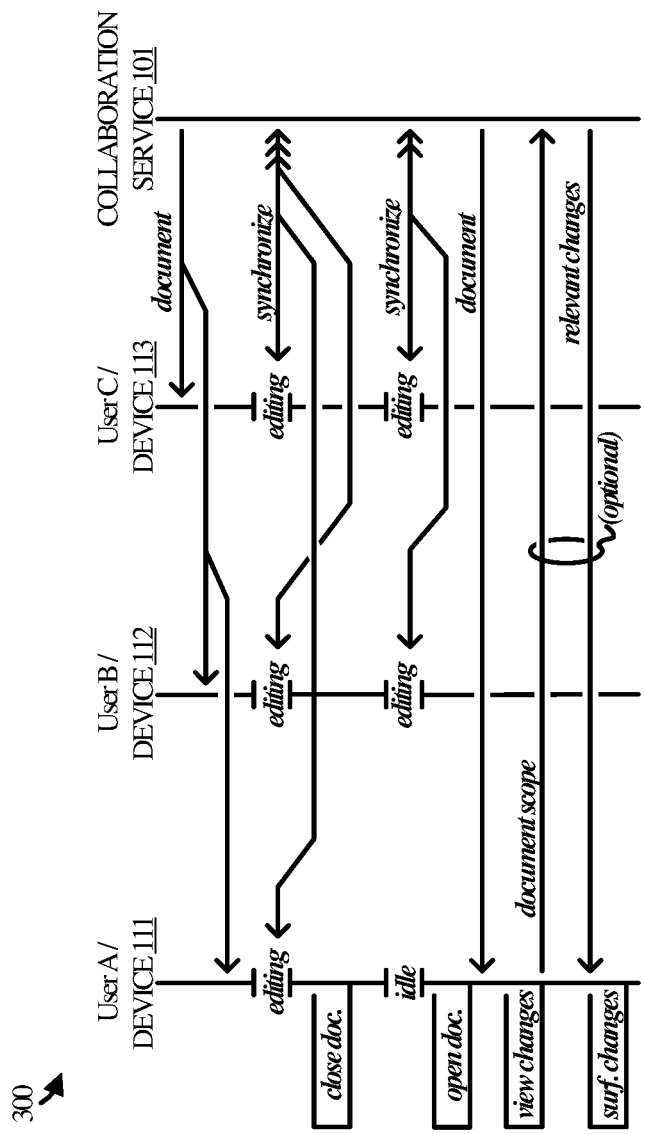
FIG. 3 illustrates an operational sequence in an implementation.

FIG. 3 includes operational sequence 300 to further illustrate various aspects of change visualization process 200. In operational sequent 300, users A, B, and C open a shared document from collaboration service 101 on computing devices 111, 112, and 113 respectively. The users proceed to engage in collaborative editing of the documents, which includes the users adding and deleting content. The edits made to the respective instances of the document are synchronized amongst them and conflicts between edits are resolved where necessary. A record of the changes is maintained by one or more of collaboration service 101 and the instances of the editing applications deployed to each computing device (e.g. a word processor).

User A proceeds to close the document on computing device 111 and remains idle for a period of time. During that period of time, user B and user C continue to edit the document. Their changes are recorded by collaboration service 101 (or their respective applications) and are synchronized between the instances of the documents.

Later, user A re-opens the document which now reflects the changes made by user B and user C while user A was idle. User A is understandably curious not only about all of the changes made to the document to bring it to its current state, but also about how the changes progressed over time. User A therefore engages with the editing application on computing device 111 to view the changes pertaining to a specific document scope defined by at least a timeframe of interest and optionally a section of the document.

The editing application, via communication device 111, may send a request to collaboration service 101 for the relevant changes. The request would identify the document scope, allowing collaboration service 101 to identify the subset of changes encompassed by the document scope. Collaboration service 101 may return the relevant changes to computing device 111 to be rendered by the editing application in the user interface.

In some implementations, the editing application need not request the relevant changes from collaboration service 101. Rather, the editing application may maintain a record of the changes locally such that the application can identify the changes itself. The changes may then be surfaced as described above, such as within clean views of the document at the specified times, within a marked-up version of the document, or both.

Figure 4:
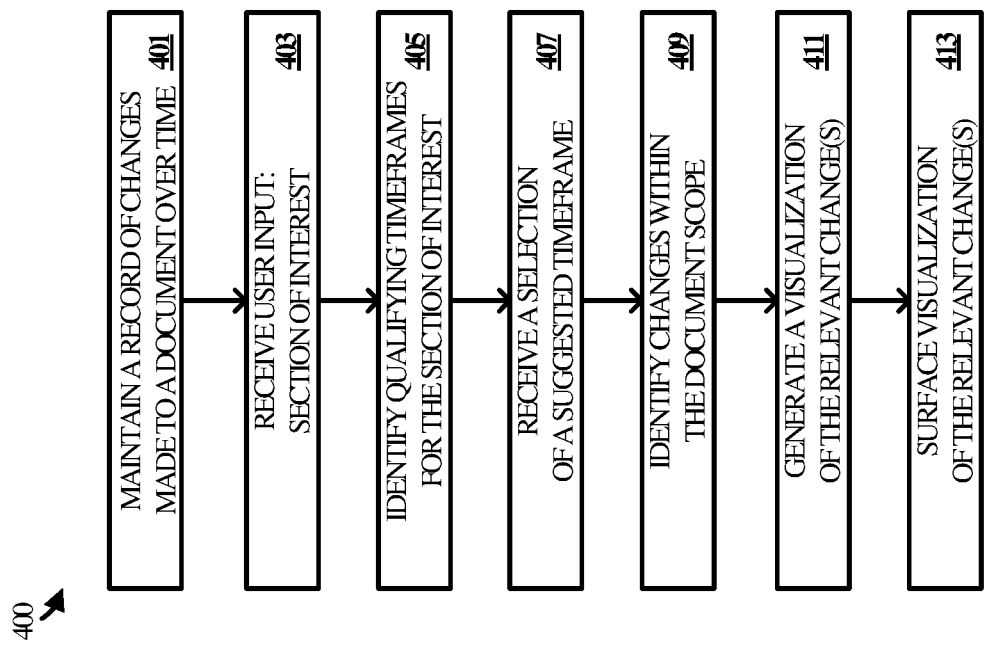
FIG. 4 illustrates a change visualization process in an implementation.

FIG. 4 illustrates a change visualization process 400 in another example of a process that may be implemented by an application running on any one or more of computing devices 111, 112, and 113, by collaboration service 101, or distributed between them. The applications and/or service employ change visualization process 400 to enhance the user experience when interacting with electronic documents in collaboration contexts. Change visualization process 400 may be implemented in program instructions in the context of any of the modules, components, or other such programming elements of the application and/or service. The program instructions direct the underlying computing system(s) to operate as described for change visualization process 400, referring parenthetically to the steps in FIG. 4.

In operation, the program instructions direct the computing system(s) to maintain a record of changes made to a document over time (step 401). The record of changes may be maintained locally with respect to an end-user, remotely, or distributed across both a local environment and the service. The record of changes identifies all of the edits made to the document over a period of time (e.g. its lifetime), including additions and deletions of content such as text to and from the document. The record includes a timestamp for each entry in the record that identifies the date and time of a given addition or deletion of content. In some implementations, the record also identifies a section of a document to which an edit pertained. The section may be identified by a paragraph number, a page, or a line in the document, for example, or any combination of the three. The sections may also be identified by unique section IDs that persist over time. In other examples, the record may identify objects, slides, images, cells, and/or cell ranges that were edited.

Next, the program instructions direct the computing system(s) to receive user input that identifies a document scope in terms of a section of interest (step 403). The user input may be, for example, a selection of one or more lines, paragraphs, or other such sections of the document. The user input may be provided by way of a mouse input, touch gesture, spoken command, or the like.

The program instructions then direct the computing system(s) to identify qualifying timeframes for the section of interest (step 405). This may be accomplished by searching the record of changes for edits made to the section of interest. Then, from the identified subset of edits, one or more clusters may be identified based on the timestamps associated with the subset of edits. A qualifying timeframe may be, for example, any range of time that includes a threshold number of edits. The threshold number of edits could be fixed but could also be dynamic. For instance, the threshold number of edits could be adjusted by user input, optimized over time, or otherwise increased or decreased.

The qualifying timeframes are surfaced in a user interface for consideration and selection by the user. The program instructions direct the computing system(s) to receive the selection of one of the suggested timeframes (step 407), in response to which the computing system(s) identifies those of the edits that fall within the document scope (step 409). This may be accomplished by searching the record of changes for those having a timestamp that falls within the timeframe and a section ID corresponding to the selected section.

The program instructions next direct the computing system(s) to generate a visualization of the changes that were identified as within the document scope (step 411). This step may include one or both of generating clean versions of the section of the document (at both the start time and the end time of the timeframe) and generating a marked-up version of the section that represents the changes that occurred to the section during the timeframe.

Lastly, the program instructions direct the computing system(s) to surface the visualization of the changes in a user interface on a display (step 413). This may include displaying both clean versions of the changes simultaneously, synchronously, or asynchronously in the user interface for the user to consider. In addition, the marked-up version may be displayed simultaneously, synchronously, or asynchronously with respect to the clean versions of the section. In some cases, the clean versions of the section are not displayed at all. In other cases, the marked-up version may not be displayed at all.

Figure 5:
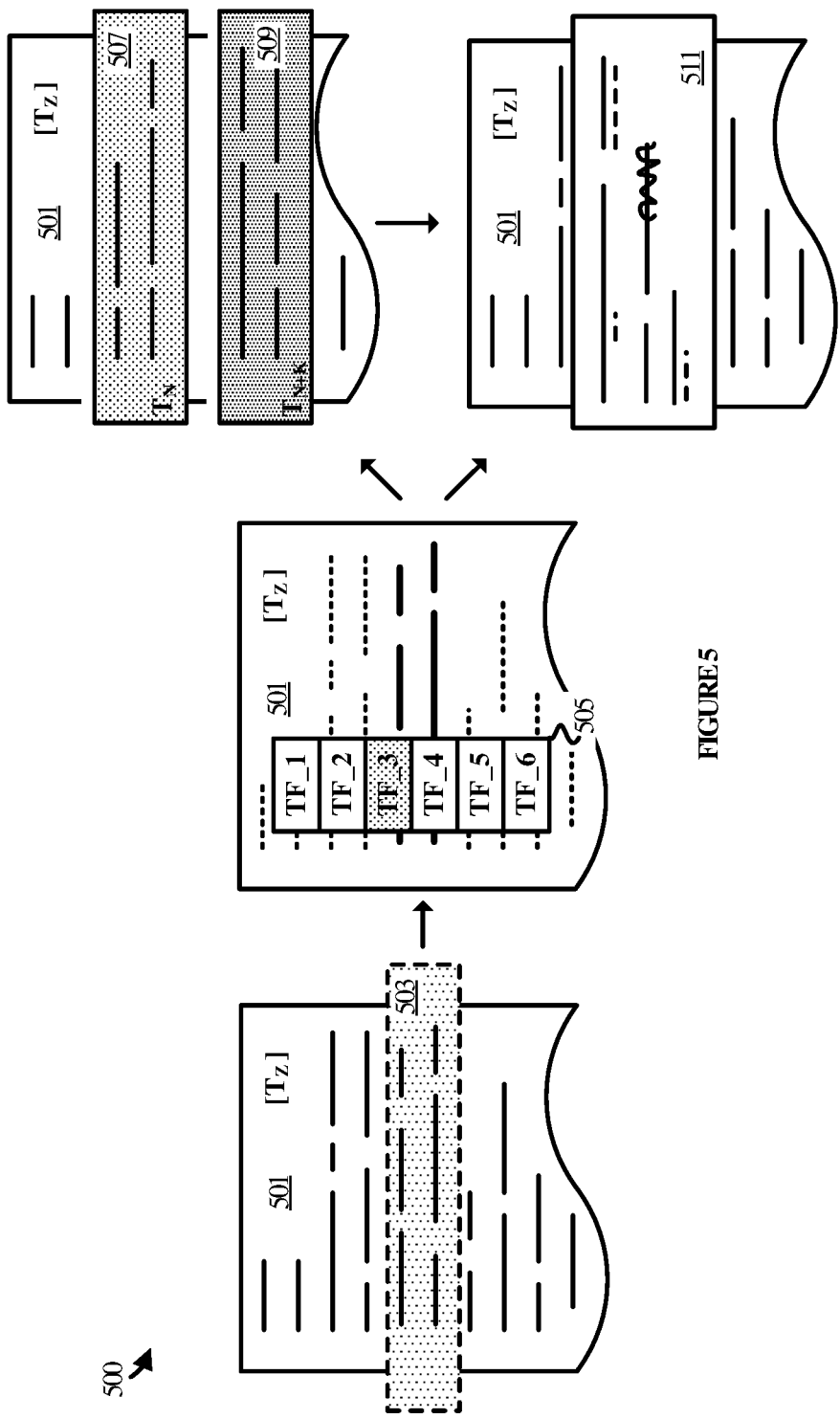
FIG. 5 illustrates an operational sequence in an implementation.

FIG. 5 illustrates a user experience 500 in an example of change visualization process 400 with respect to the elements of operational environment 100. User experience 500 begins with document 501 in a current state at time "z" represented by $T_Z$. Document 501 includes text or other such content on a document canvas. The content may have been supplied by one or more of users A, B, and C over a period of time during which the changes made to the document were recorded by collaboration service 101 and/or the applications on computing devices 111, 112, and 113.

It is assumed for exemplary purposes that user A wishes to see the progression of changes made to the document with respect to a particular section. Accordingly, user A supplies user input comprising a selection 503 of a section of the document. The user input may be supplied via a mouse action, a touch gesture, a voice command, or any other type of user input. Several lines of text are selected in this example, although one or more paragraphs, pages, or other such sections could be selected. In addition, the entire document could be selected for analysis and visualization and could be the default selection in the absence of a more granular selection.

Having made the selection 503 of a section of document 501, a set 505 of suggested timeframes are surfaced in the user interface for the user to consider. In this example, it is assumed for exemplary purposes that six different timeframes where identified for which at least a threshold number of changes were made with respect to the selected section. It is further assumed for exemplary purposes that the user selects timeframe 3 from the suggested timeframes. In this example, the selected timeframe is represented in terms of a start time ($T_N$) and an end time ($T_{N+K}$).

Next, the changes related to the timeframe and section defined by the document scope are identified and surfaced in the user interface. In this example, two versions of the identified section are surfaced that correspond to the start and end times of the timeframe. Version 507 represents the state of the selected section at $T_N$, while version 509 represents the state of the section at $T_{N+K}$. In addition to (or instead of) versions 507 and 509, a marked-up version 511 of the section is surfaced. The marked-up version 511 identifies the progression of changes from version 507 relative to version 509. User A may thus consider one or both of the clean versions of the section, at either end of the timeframe, and the marked-up version of the section showing how the section changed from the beginning to the end of the timeframe.

Figure 6:
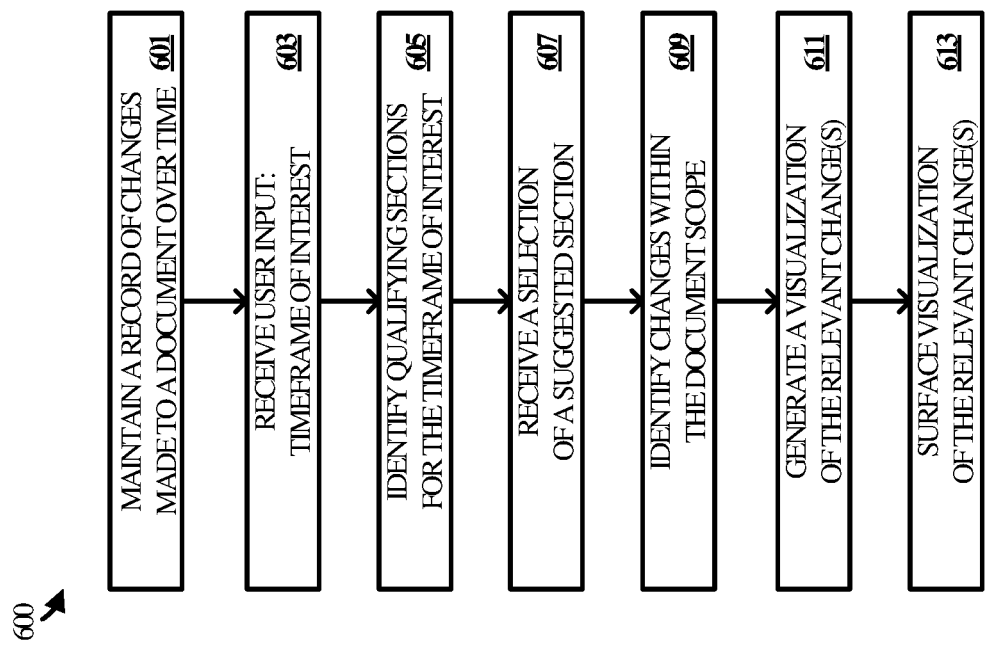
FIG. 6 illustrates a change visualization process in an implementation.

FIG. 6 illustrates a change visualization process 600 in another example of a process that may be implemented by an application running on any one or more of computing devices 111, 112, and 113, by collaboration service 101, or distributed between them. The applications and/or service employ change visualization process 600 to enhance the user experience when interacting with electronic documents in collaboration contexts. Change visualization process 600 may be implemented in program instructions in the context of any of the modules, components, or other such programming elements of the application and/or service. The program instructions direct the underlying computing system(s) to operate as described for change visualization process 600, referring parenthetically to the steps in FIG. 6.

In operation, the program instructions direct the computing system(s) to maintain a record of changes made to a document over time (step 601). The record of changes may be maintained locally with respect to an end-user, remotely, or distributed across both a local environment and the service. The record of changes identifies all of the edits made to the document over a period of time (e.g. its lifetime), including additions and deletions of content such as text to and from the document. The record includes a timestamp for each entry in the record that identifies the date and time of a given addition or deletion of content. In some implementations, the record also identifies a section of a document to which an edit pertained. The section may be identified by a paragraph number, a page, or a line in the document, for example, or any combination of the three. The sections may also be identified by unique section IDs that persist over time. In other examples, the record may identify objects, slides, images, cells, and/or cell ranges that were edited.

Next, the program instructions direct the computing system(s) to receive user input that identifies a document scope in terms of a timeframe of interest (step 603). The user input may be, for example, a selection of dates from a menu to define a date range. In another example, the user input could be a selection of a date range from a set of possible date ranges.

The program instructions then direct the computing system(s) to identify qualifying sections associated with the timeframe of interest (step 605). This may be accomplished by searching the record of changes for edits made to any section of interest. Then, from the identified sections, a subset of sections may be identified based on the timestamps associated with the subset. A qualifying section may be, for example, any section that includes a threshold number of edits during the specified timeframe. The threshold number of edits could be fixed but could also be dynamic. For instance, the threshold number of edits could be adjusted by user input, optimized over time, or otherwise increased or decreased.

The qualifying sections are surfaced in a user interface for consideration and selection by the user. The program instructions direct the computing system(s) to receive the selection of one of the suggested sections (step 607), in response to which the computing system(s) identifies those of the edits that fall within the document scope (step 609). This may be accomplished by searching the record of changes for those having a timestamp that falls within the timeframe and a section ID corresponding to the selected section.

The program instructions next direct the computing system(s) to generate a visualization of the changes that were identified as within the document scope (step 611). This step may include one or both of generating clean versions of the section of the document (at both the start time and the end time of the timeframe) and generating a marked-up version of the section that represents the changes that occurred to the section during the timeframe.

Lastly, the program instructions direct the computing system(s) to surface the visualization of the changes in a user interface on a display (step 613). This may include displaying both clean versions of the changes simultaneously, synchronously, or asynchronously in the user interface for the user to consider. In addition, the marked-up version may be displayed simultaneously, synchronously, or asynchronously with respect to the clean versions of the section. In some cases, the clean versions of the section are not displayed at all. In other cases, the marked-up version may not be displayed at all.

Figure 7:
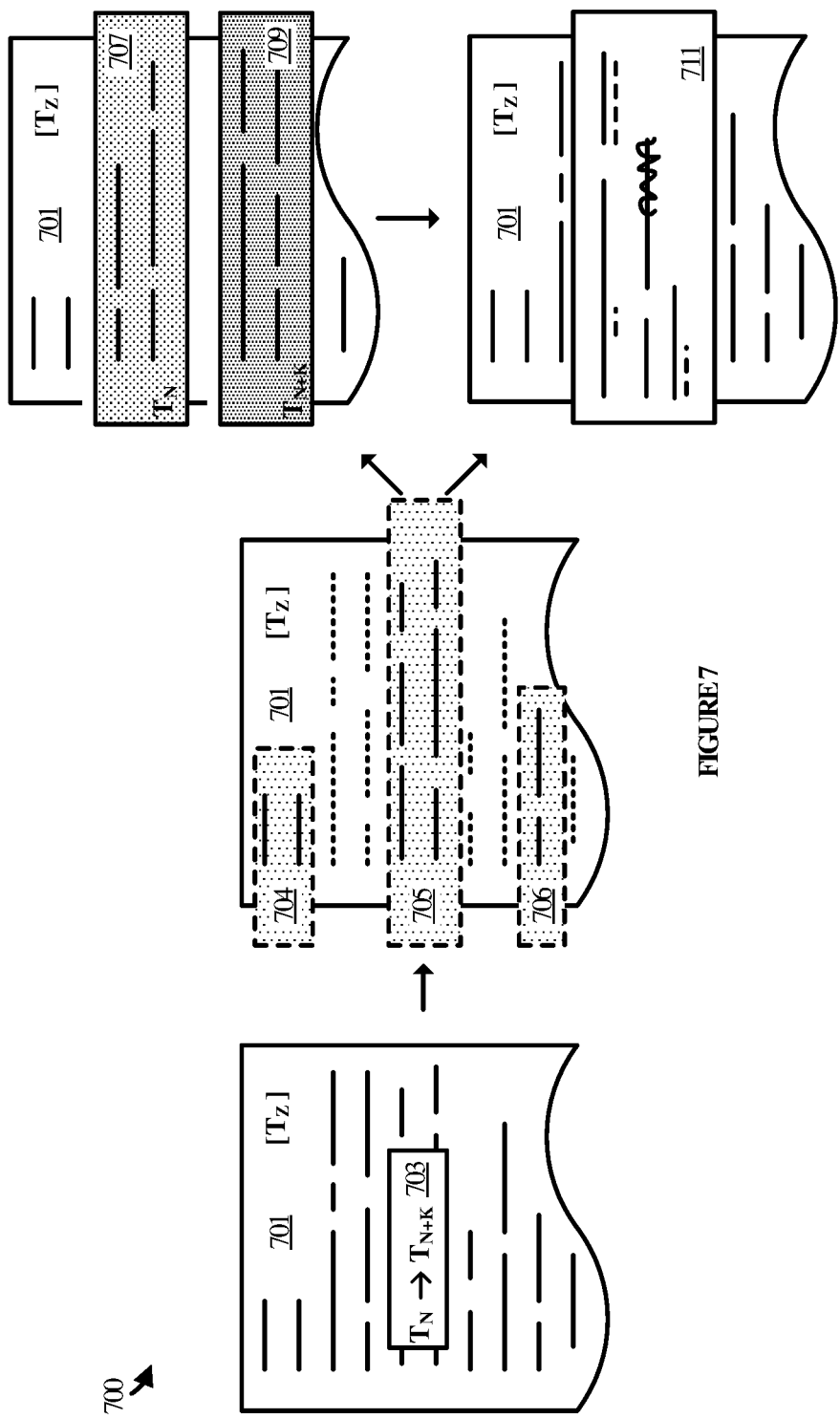
FIG. 7 illustrates an operational sequence in an implementation.

FIG. 7 illustrates a user experience 700 in an example of change visualization process 600 with respect to the elements of operational environment 100. User experience 700 begins with document 701 in a current state at time "z" represented by $T_Z$. Document 701 includes text or other such content on a document canvas. The content may have been supplied by one or more of users A, B, and C over a period of time during which the changes made to the document were recorded by collaboration service 101 and/or the applications on computing devices 111, 112, and 113.

It is assumed for exemplary purposes that user A wishes to see the progression of changes made to the document with respect to a particular timeframe. Accordingly, user A supplies user input 703 comprises a start time and an end time. In this example, the selected timeframe is represented in terms of a start time ($T_N$) and an end time ($T_{N+K}$).

Having indicated the timeframe of interest, sections 704, 705, and 706 are identified and surfaced in the user interface for the user to consider. In this example, it is assumed for exemplary purposes that three different sections where identified in the document for which at least a threshold number of changes were made within the identified timeframe. It is further assumed for exemplary purposes that the user selects section 705.

Next, the changes related to the timeframe and section defined by the document scope are identified and surfaced in the user interface. In this example, two versions of the identified section are surfaced that correspond to the start and end times of the timeframe. Version 707 represents the state of the selected section at $T_N$, while version 709 represents the state of the section at $T_{N+K}$. In addition to (or instead of) versions 707 and 709, a marked-up version 711 of the section is surfaced. The marked-up version 711 identifies the progression of changes from version 707 relative to version 709. User A may thus consider one or both of the clean versions of the section, at either end of the timeframe, and the marked-up version of the section showing how the section changed from the beginning to the end of the timeframe.

Figure 8:
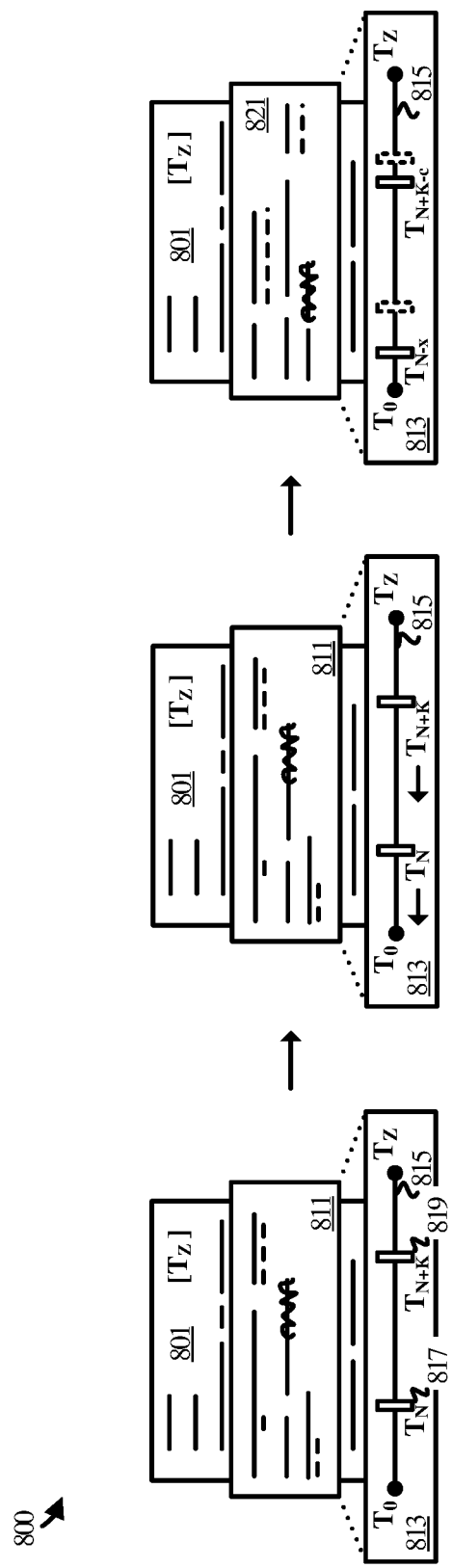
FIG. 8 illustrates an operational sequence in an implementation.

FIG. 8 illustrates a user experience 800 in another example of the change visualization processes disclosed herein with respect to the elements of operational environment 100. User experience 800 begins with document 801 in a current state at time "z" represented by $T_Z$. Document 801 includes text or other such content on a document canvas. The content may have been supplied by one or more of users A, B, and C over a period of time during which the changes made to the document were recorded by collaboration service 101 and/or the applications on computing devices 111, 112, and 113.

It is assumed for exemplary purposes that user A wishes to see the progression of changes made to the document with respect to a particular timeframe. Accordingly, user A has supplied user input that comprises a start time and an end time. In this example, the selected timeframe is represented in terms of a start time ($T_N$) and an end time ($T_{N+K}$). A marked-up version 811 of a section of document 801 is shown with the changes that occurred between the two times input by the user.

The user input was provided by the user via graphical control 813. Graphical control 813 includes a time bar 815 along which a user can select a start time and an end time to define a timeframe of interest. Here, the user has specified a start time ($T_N$) and an end time ($T_{N+K}$) via sub-control 813 and sub-control 819. Other forms of input controls are possible, such as text boxes, drop-down menus, spoken commands, and the like.

Having indicated the initial timeframe of interest, the user proceeds to slide the timeframe to the left. The start time ($T_N$) is moved up to an earlier start time ($T_{N-x}$) and the end time ($T_{N+K}$) is also moved up to an earlier time ($T_{N+K-c}$). While the times are moved up in this example, they could be moved forward in time (closer to $T_Z$), moved in opposite directions relative to each other, or one of the times could be held constant. In any case, user experience 800 progresses to a new marked-up version 821 of the section of document 801 that is of interest to the user. The new marked-up version 821 of the section identifies that changes that were made to the section from the new start time ($T_{N-x}$) to the new end time ($T_{N-K-c}$).

It may be appreciated from FIG. 8 that the user is able to identify any start time and any end time that he or she may desire. In some implementations, a single sub-control may be present that the user can slide along the time bar 815 in order to see the progression of changes. In such an example, the timeframe may be anchored by a default start time at $T_0$ and may extend to wherever along the time bar 815 the sub-control is placed. In another example, the timeframe may be anchored by a default end time ($T_Z$) and may extend backward in time to wherever along the time bar 815 the sub-control is placed.

Various technical effects that may be appreciated from the foregoing disclosure include the ability for a user to view differences between versions of sections in a document without multiple versions of the document having to be stored. This reduces storage overhead and minimizes the complexity associated with managing multiple versions of a document. The user experience is also improved in that a user need not manually ascertain the progression of changes that led to a current state of a document.

FIG. 9 illustrates computing device 901 that is representative of any system or collection of systems in which the various processes, programs, services, and scenarios disclosed herein may be implemented. Examples of computing device 901 include, but are not limited to, server computers, cloud computing platforms, and data center equipment, as well as any other type of physical or virtual server machine, container, and any variation or combination thereof. Other examples include desktop computers, laptop computers, table computers, Internet of Things (IoT) devices, wearable devices, and any other physical or virtual combination or variation thereof.

Computing device 901 may be implemented as a single apparatus, system, or device or may be implemented in a distributed manner as multiple apparatuses, systems, or devices. Computing device 901 includes, but is not limited to, processing system 908, storage system 903, software 905, communication interface system 907, and user interface system 909 (optional). Processing system 908 is operatively coupled with storage system 903, communication interface system 907, and user interface system 909.

Processing system 908 loads and executes software 905 from storage system 903. Software 905 includes and implements change visualization process 906, which is representative of the change visualization processes discussed with respect to the preceding Figures. When executed by processing system 908 to enhance the user experience with respect to viewing changes in documents, software 905 directs processing system 908 to operate as described herein for at least the various processes, operational scenarios, and sequences discussed in the foregoing implementations. Computing device 901 may optionally include additional devices, features, or functionality not discussed for purposes of brevity.

Referring still to FIG. 9, processing system 908 may comprise a micro-processor and other circuitry that retrieves and executes software 905 from storage system 903. Processing system 908 may be implemented within a single processing device but may also be distributed across multiple processing devices or sub-systems that cooperate in executing program instructions. Examples of processing system 908 include general purpose central processing units, graphical processing units, application specific processors, and logic devices, as well as any other type of processing device, combinations, or variations thereof.

Storage system 903 may comprise any computer readable storage media readable by processing system 908 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 908 or possibly other systems.

Software 905 (including change visualization process 906) may be implemented in program instructions and among other functions may, when executed by processing system 908, direct processing system 908 to operate as described with respect to the various operational scenarios, sequences, and processes illustrated herein. For example, software 905 may include program instructions for implementing a change visualization process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtualization software, or other application software. Software 905 may also comprise firmware or some other form of machine-readable processing instructions executable by processing system 908.

In general, software 905 may, when loaded into processing system 908 and executed, transform a suitable apparatus, system, or device (of which computing device 901 is representative) overall from a general-purpose computing system into a special-purpose computing system customized to provide enhanced change visualizations in electronic documents. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:
   one or more computer readable storage media;
   a processing system operatively coupled to the one or more computer readable storage media; and
   program instructions stored on the one or more computer readable storage media that, when executed by the processing system, direct the computing apparatus to at least:
      maintain a record of changes made to a document over a period of time;
      identify a document scope within which to focus a visualization of one or more changes made to the document, wherein the document scope comprises a timeframe of interest, having a starting point after a beginning of the document and an end point prior to an end of the document, and a section of the document;
      identify, from the record of the changes, a state of the document at the starting point, a state of the document at the end point, and a progression of changes having a timestamp that falls within the timeframe of interest and that correspond to the section of the document;
      generate a visualization of a change from the state of the document at the starting point to the state of the document at the end point; and
      surface the visualization of the change in a user interface, wherein the visualization comprises:
         a visualization of a state of the section of the document at the starting point,
         a visualization of a state of the section of the document at the end point, and
         a visualization of the progression of changes.

2. The computing apparatus of claim 1 wherein to identify, from the record of the changes, the state of the document at the starting point, the state of the document at the end point, and the progression of changes having a timestamp that falls within the timeframe of interest and that correspond to the section of the document, the program instructions direct the computing apparatus to search the record of the changes for those of the changes having a section identifier corresponding to the section of the document.

3. The computing apparatus of claim 2 wherein to identify the timeframe of interest, the program instructions direct the computing apparatus to identify a range of time that includes a threshold number of edits.

4. The computing apparatus of claim 3 wherein the threshold number of edits is a dynamic number.

5. The computing apparatus of claim 1 wherein the program instructions further direct the computing apparatus to identify the timeframe of interest.

6. The computing apparatus of claim 1 wherein to identify the document scope, the program instructions direct the computing apparatus to receive an input indicative of the document scope.

7. The computing apparatus of claim 6 wherein the input comprises a selection of the section of the document and a selection of the timeframe of interest.

8. A method for visualizing changes made to documents, the method comprising:
   maintaining a record of changes made to a document over a period of time;
   identifying a document scope within which to focus a visualization of one or more changes made to the document, wherein the document scope comprises a timeframe of interest, having a starting point after a beginning of the document and an end point prior to an end of the document, and a section of the document;
   identifying, from the record of the changes, a state of the document at the starting point, a state of the document at the end point, and a progression of changes having a timestamp that falls within the timeframe of interest and that correspond to the section of the document;
   generating a visualization of a change from the state of the document at the starting point to the state of the document at the end point; and enabling display, in a user interface, of the visualization, wherein the visualization comprises:
- a visualization of a state of the section of the document at the starting point,
- a visualization of a state of the section of the document at the end point, and
- a visualization of the progression of changes.

9. The method of claim 8 wherein identifying, from the record of the changes, the state of the document at the starting point, the state of the document at the end point, and a progression of changes having a timestamp that falls within the timeframe of interest and that correspond to the section of the document comprises searching the record of the changes for those of the changes having a section identifier corresponding to the section of the document.

10. The method of claim 8 further comprising identifying the timeframe of interest.

11. The method of claim 10 wherein identifying the timeframe of interest comprises identifying a range of time that includes a threshold number of edits.

12. The method of claim 11 wherein the threshold number of edits is a dynamic number.

13. The method of claim 8 wherein identifying the document scope comprises receiving an input indicative of the document scope.

14. The method of claim 13 wherein the input comprises a selection of the section of the document and a selection of the timeframe of interest.

15. A method of operating a collaboration service comprising:
- receiving, from a plurality of devices, a plurality of changes made to a document over a period of time;
- receiving a request for a visualization of one or more changes made to the document, wherein the request includes a document scope within which to focus the visualization, and wherein the document scope comprises a timeframe of interest, having a starting point after a beginning of the document and an end point prior to an end of the document, and a section of the document;
- identifying a state of the document at the starting point, a state of the document at the end point, and a progression of changes having a timestamp that falls within the timeframe of interest and that correspond to the section of the document;
- generating, based at least on a change from the state of the document at the starting point to the state of the document at the end point, the visualization comprising a visualization of a state of the section of the document at the starting point, a visualization of a state of the section of the document at the end point, and a visualization of the progression of changes; and
- replying to the request with the visualization.

16. The method of claim 15 wherein identifying the state of the document at the starting point, the state of the document at the end point, and a progression of changes having a timestamp that falls within the timeframe of interest and that correspond to the section of the document comprises searching the plurality of changes for those of the changes having a section identifier corresponding to the section of the document.

17. The method of claim 15 wherein the document comprises one of a word processing document, a spreadsheet workbook, and a slide presentation.

18. The method of claim 15 further comprising identifying the timeframe of interest based on a range of time that includes a threshold number of edits.

19. The method of claim 18 wherein the threshold number of edits is a dynamic number.

20. The method of claim 15 further comprising identifying the timeframe of interest based on an input comprising a range of time.

* * * * *